(12) United States Patent
Wu et al.

(10) Patent No.: US 7,604,584 B1
(45) Date of Patent: Oct. 20, 2009

(54) AUTOMATIC TOOL-CHANGING ARM OF AUTOMATIC TOOL CHANGER

(75) Inventors: Chi-Chung Wu, Taichung (TW); Yueh-Hsia Li, Taichung (TW)

(73) Assignee: Campro Precision Machinery Co., Ltd., Taichung (TW)

( * ) Notice: Subject to any disclaimer, the term of this patent is extended or adjusted under 35 U.S.C. 154(b) by 0 days.

(21) Appl. No.: 12/214,333

(22) Filed: Jun. 18, 2008

(51) Int. Cl.
*B23Q 3/157* (2006.01)
(52) U.S. Cl. .......................... 483/44; 483/39; 483/902; 294/88; 294/106; 294/115
(58) Field of Classification Search .................... 483/39, 483/44, 902, 66–67, 36, 38, 40, 45, 48, 49; 294/88, 106, 115
See application file for complete search history.

(56) References Cited

U.S. PATENT DOCUMENTS

| | | | | |
|---|---|---|---|---|
| 4,426,763 A | * | 1/1984 | Hornok et al. | 483/902 |
| 5,620,406 A | * | 4/1997 | Bae | 483/39 |
| 5,938,578 A | * | 8/1999 | Baba | 483/39 |
| 6,007,464 A | * | 12/1999 | Hashimoto | 483/39 |
| 6,846,276 B2 | * | 1/2005 | Yasumatsuya et al. | 483/39 |
| 2006/0135333 A1 | * | 6/2006 | Sun | 483/39 |

FOREIGN PATENT DOCUMENTS

FR 2623742 A1 * 6/1989

* cited by examiner

*Primary Examiner*—Erica E Cadugan
(74) *Attorney, Agent, or Firm*—Charles E. Baxley

(57) ABSTRACT

An automatic tool-changing arm of an automatic tool changer applicable to a machine tool, primarily comprises an immovable platform, a movable platform located below the immovable platform, a platform driving device driving the movable platform to vertically move with respect to the immovable platform, a gear assembly settled on the moveable platform and an arm body fixedly attached to the movable platform and to be rotated by the gear assembly, wherein the arm body has two ends each equipped with a clamp driving device and a power clamp. Thereby, the arm body can perform vertical movements and horizontal rotations precisely and stably so as to enhance the reliability of the tool-changing arm.

5 Claims, 4 Drawing Sheets

US 7,604,584 B1

AUTOMATIC TOOL-CHANGING ARM OF AUTOMATIC TOOL CHANGER

BACKGROUND OF THE INVENTION

1. Technical Field

The present invention relates to an automatic tool changer applicable to a machine tool, and more particularly, to an automatic tool-changing arm of an automatic tool changer being stably controllable and having a power clamp that serves to firmly hold a tool.

2. Description of Related Art

An ATC (Automatic Tool Changer) is typically provided to a machine tool to significantly improve the efficiency of the machine tool by saving time in moving, switching, installing and storing tools as well as adjusting and calibrating the machine tool. That is to say, the reliability as well velocity of an ATC can directly affect the efficiency of a machine tool it serves and thus are usually taken as the major index for design, selection and evaluation of an ATC.

The conventional ATC generally has a tool magazine for storing tools and an automatic tool-changing arm simultaneously holding and exchanging a tool to be replaced as well as another tool to be assembled to a machine tool. Traditionally, the tool-changing arm is designed with a relatively simple structure. Particularly, tool clamps thereof are formed as single-side-opening hooks for holding tools with a simple engagement mechanism. The transitional tool-changing arm is disadvantaged by incapability of accurately controlling the tool exchange and the risk of falling tools. Thus, the stability and reliability of the conventional ATC need to be improved. Besides, the transitional tool-changing arm is not adaptable to all the existing tool holders of various specifications, such as the Japanese style and the US style.

Hence, a need exists for providing an automatic tool changer with a tool-changing arm having excellent stability, reliability and industrial applicability.

SUMMARY OF THE INVENTION

In view of the aforementioned need, one objective of the present invention is to provide an automatic tool-changing arm that serves to firmly hold a tool holder so that the tool holder is secured from falling during transference.

Another objective of the present invention is to provide an automatic tool-changing arm that is adaptive to tool holders of various specifications and therefore present improved industrial applicability.

Still another objective of the present invention is to provide an automatic tool-changing arm that is such designed that it is allowed to perform vertical movement and horizontal rotation precisely and stably so as to enhance the reliability of the tool-changing arm.

To achieve these and other objectives of the present invention, the disclosed automatic tool-changing arm primarily comprises an immovable platform, a movable platform located below the immovable platform, a platform driving device driving the movable platform to vertically move with respect to the immovable platform, a gear assembly settled on the moveable platform and an arm body fixedly attached to the movable platform and to be rotated by the gear assembly, wherein the arm body has two ends each equipped with a clamp driving device and a power clamp.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Please refer to FIGS. 1 to 5 for a preferred embodiment of an automatic tool-changing arm according to the present invention. Therein, the automatic tool-changing arm primarily comprises an immovable platform 10, a movable platform 20 located below the immovable platform, a platform driving device driving the immovable platform 20 to vertically move with respect to the immovable platform 10, a gear assembly settled on the moveable platform 20 and an arm body 30 fixedly attached to the movable platform and to be rotated by the platform driving device, wherein the arm body 30 has two ends each equipped with a clamp driving device and a power clamp 40 to be driven by the clamp driving device.

Figure 1:
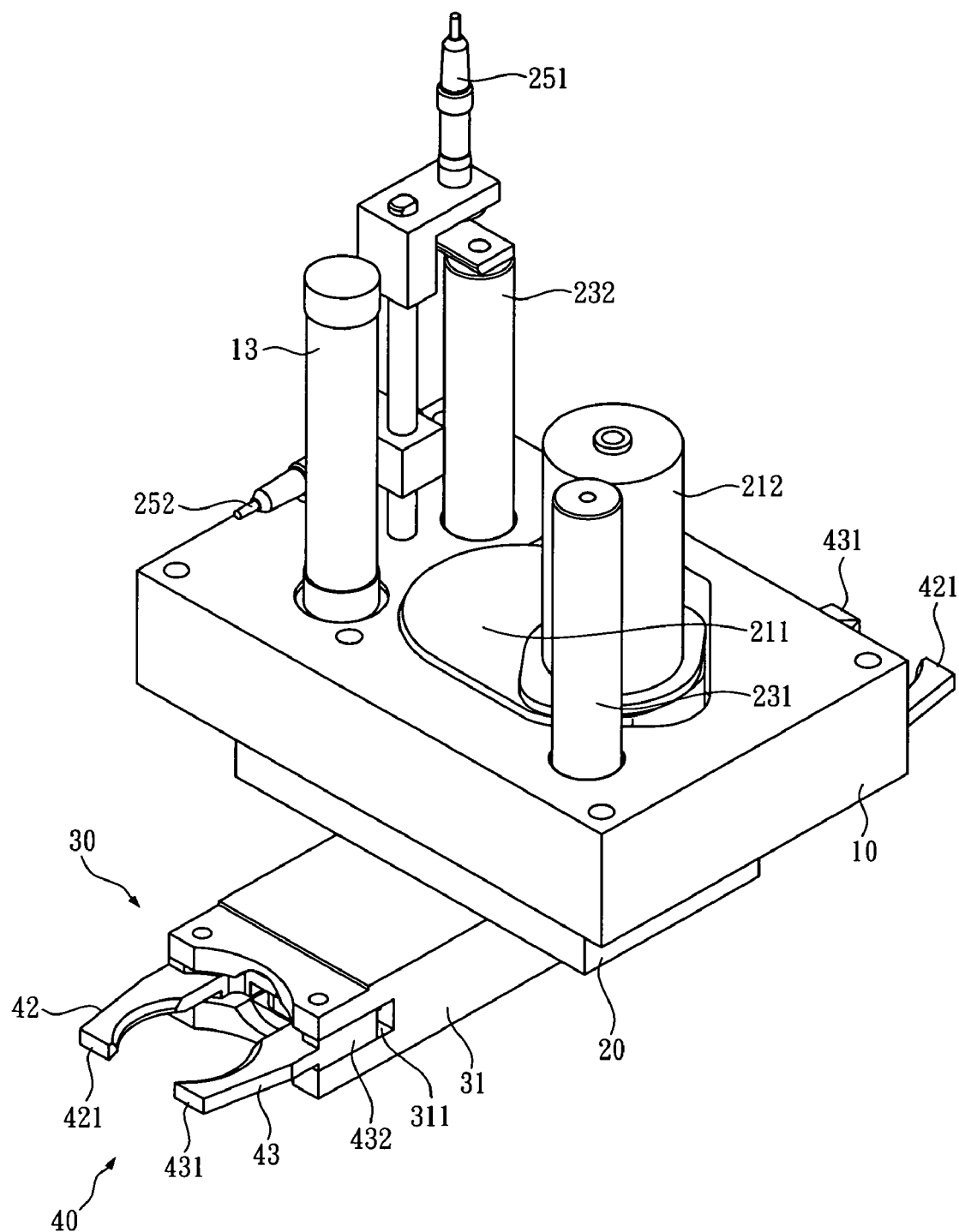
FIG. 1 is a perspective view of an automatic tool-changing arm according to the present invention.
Figure 2:
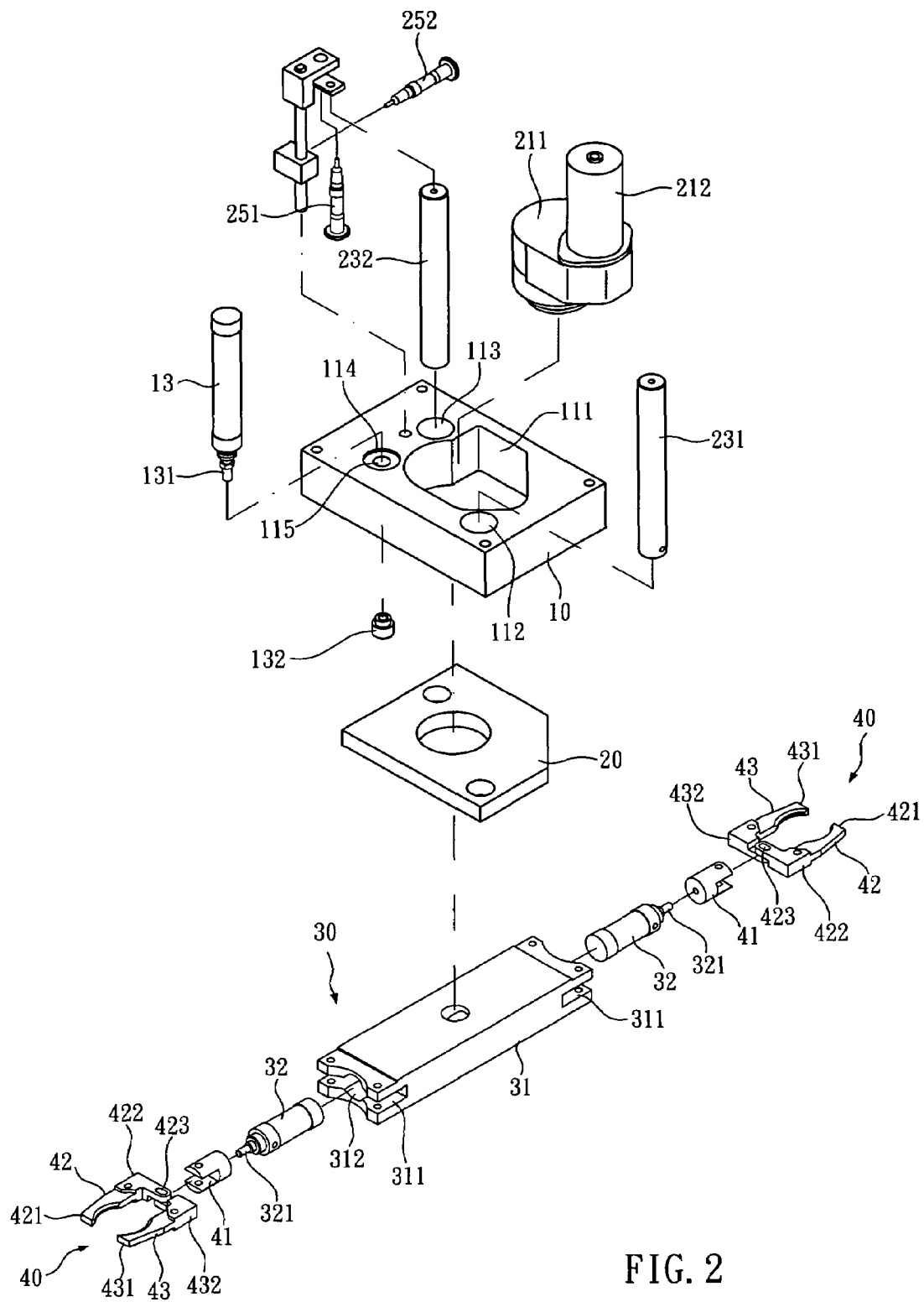
FIG. 2 is an exploded view of the automatic tool-changing arm according to the present invention.

As can be seen in FIGS. 1 and 2, a gearbox 211 is settled on the moveable platform 20 and has a driving motor 212. Besides, a first sliding rod 231 and a second sliding rod 232 are fixedly attached to two diagonal corners of the moveable platform 20.

The movable platform 20 is aligned to the immovable platform 10 located thereon. The immovable platform 10 has a plurality of through holes for accommodating the foregoing components attached to the movable platform 20. In other words, these through holes are positioned and formed according to the components attached to the movable platform 20 and are herein defined as a gear-box hole 111, a first-sliding-rod hole 112 and a second-sliding-rod hole 113. By these through holes, when the movable platform 20 come close to the immovable platform 10, an upper surface of the movable platform 20 and a lower surface of the immovable platform 10 can abut each other and the immovable platform 10 can stably position the movable platform 20.

Furthermore, a cylinder seat that comprises a depressed seat 114 and a central hole 115 is also provided on the immovable platform 10 so that a hydraulic cylinder 13 can be settled therein with a driving shaft end 132 thereof passing through the central hole 115 and fixedly attached to the upper surface of the moveable platform 20.

Figure 3:
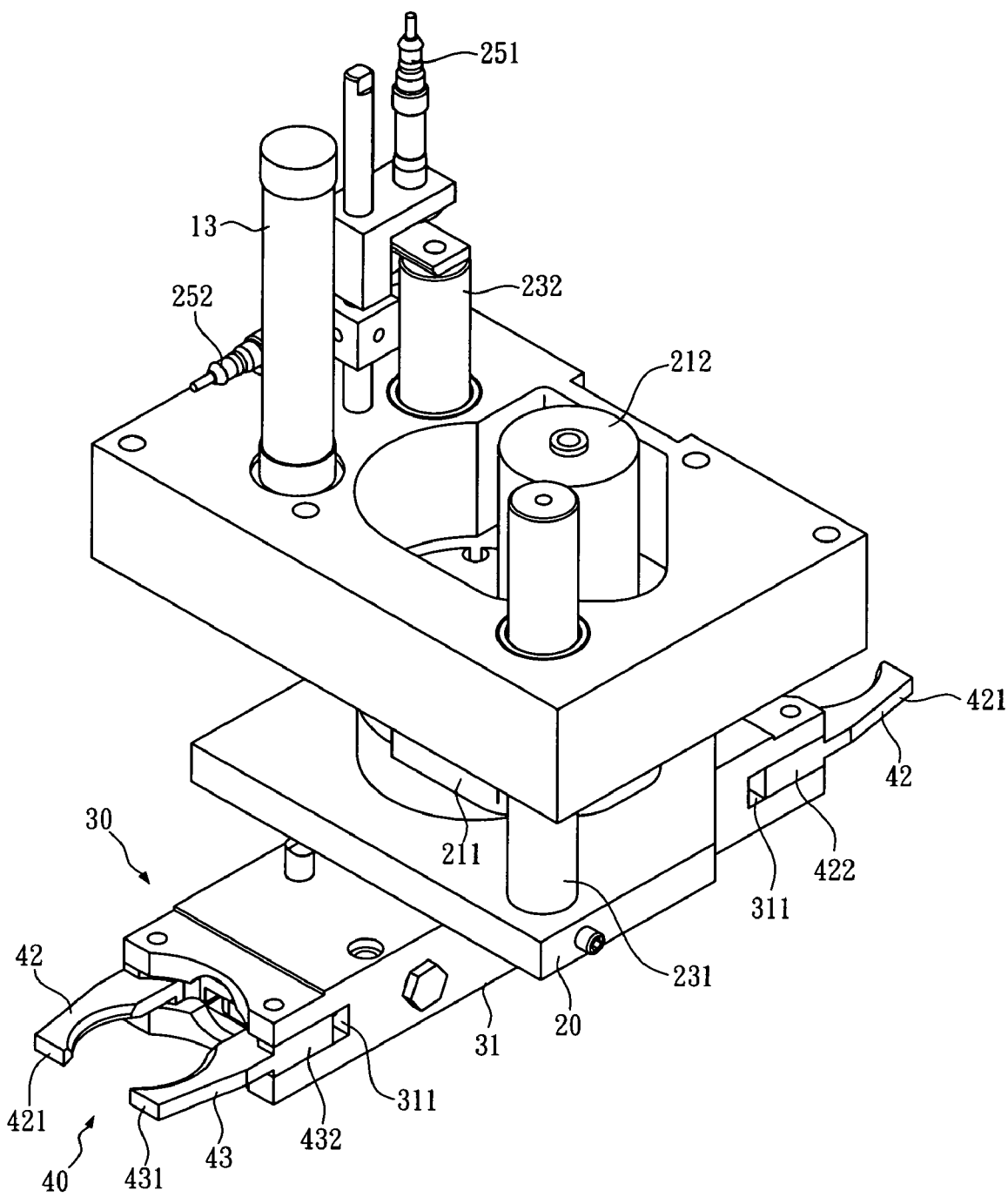
FIG. 3 is another perspective view of the automatic tool-changing arm according to the present invention, showing an arm body thereof vertically descended.

Hence, in an idle position, the immovable platform 20 upwardly abuts the movable platform 10 due to a driving shaft 131 of the hydraulic cylinder 13 linking therebetween. When the hydraulic cylinder 13 is actuated, the driving shaft 131 vertically pushed the moveable platform 20 downward to make it descend from the idle position where the moveable platform 20 abuts the movable platform 10. At this time, the first sliding rod 231 and the second sliding rod 232 fixedly attached to the moveable platform 20 also stably descend with restriction from the first-sliding-rod hole 112 and the second-sliding-rod hole 113 so as to ensure the moveable platform 20 moves stably with respect to the immovable platform 10 and stops at a predetermined descended position, as shown in FIG. 3. In a contrary operation, when the hydraulic cylinder 13 retracts its driving shaft 131, the driving shaft end 132 pulls the movable platform 20 upward and brings the movable platform 20 back to the idle position where it abuts the immovable platform 10.

According to the present embodiment, sensors may be further provided between the immovable platform 10 and the movable platform 20. Referring to the drawings, two sensors 251 and 252, provided for the second sliding rod 232, are so settled that their sensing point are perpendicular to each other so as to precisely detect a relative movement between the immovable platform 10 and the movable platform 20 and provide information about the relative movement to a machine tool where the tool-changing arm is applied, thereby ensuing an improved accuracy and stability of the operation of the automatic tool-changing arm.

Figure 4:
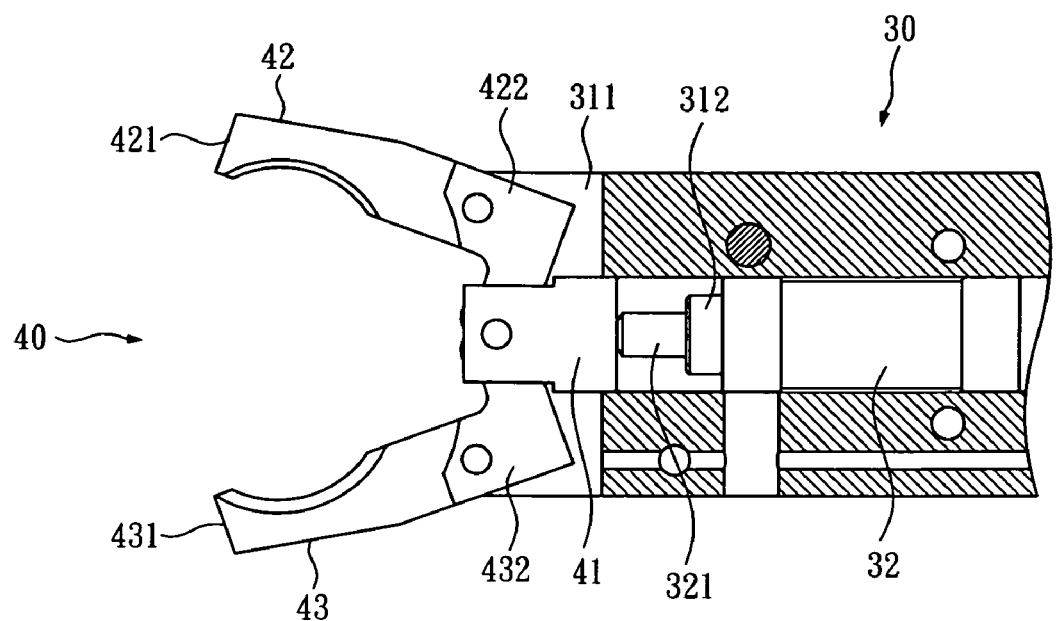
FIG. 4 is a cross-sectional view of a clamp of the arm body according to the present invention.
Figure 5:
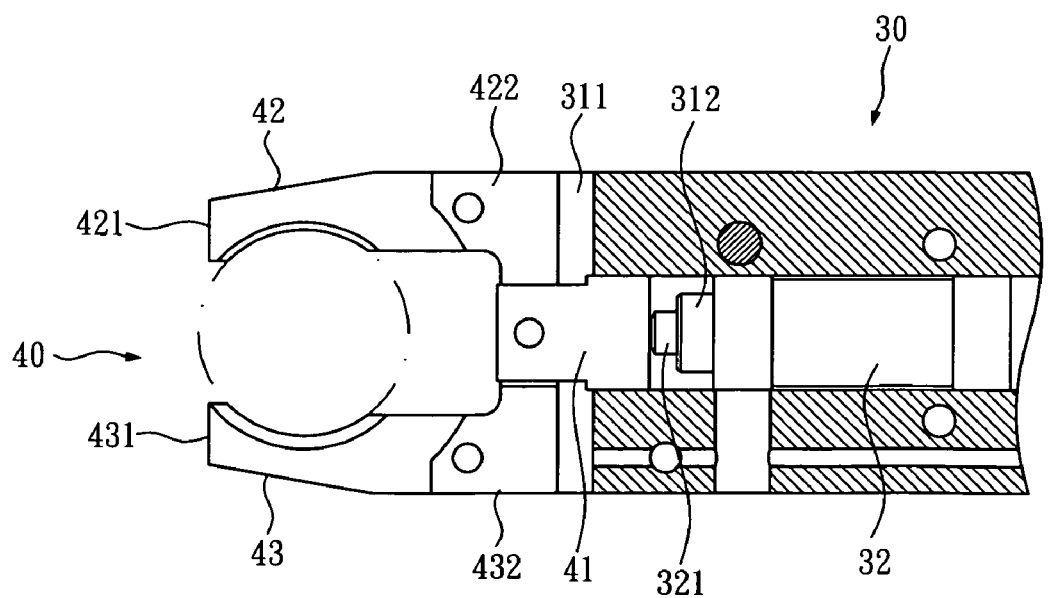
FIG. 5 is a schematic drawing illustrating a clamping motion of the clamp of FIG. 4.

Now the preference is made to FIGS. 4 and 5 for further illustrating the arm body 30 of the disclosed automatic tool-changing arm. The arm body 30 primarily comprises a trunk 31 that has its upper surface rotatably connected with a lower surface of the movable platform 20 so as to be horizontally rotated with respect to the moveable platform 20 by the gearbox 211 settled on the movable platform 20. Two ends of the trunk 31 are formed with a recess, respectively, for accommodating the clamp 40 and the clamping-driving device 32 that drives the clamp 40 to open or close. In the present embodiment, each said recess of the trunk 31 comprises a clamp seat 311 and a cylinder seat 312. The cylinder seat 312 accommodates a hydraulic cylinder 32 which has a driving shaft 321, having a leading block 41 fixedly attached to an end thereof, facing the clamp seat 311. In each said clamp seat 311, a pair of jaws are provided and herein defined as a first jaw 42 and a second jaw 43. Each said jaw 42 or 43 has one end functioning as a clamping end 421 or 431 and an opposite end functioning as a pivoting end 422 or 432. One connecting hole 423 is formed on each of the pivoting ends 422, 432, so that when the pivoting ends 422, 432 of the first jaw 42 and the second jaw 43 are superposed, the connecting holes 423 thereof are coincided to allow the pivoting ends 422, 432 to be pivotally connected with the leading block 41 so as to form an controllable clamp 40.

Thereby, when the hydraulic cylinder 32 retracts its driving shaft 321, the driving shaft 321 draws the leading block 41 and the jaws 42, 43 to move inward the trunk 31 and then when the pivoting ends 422, 432 of the jaws 42, 43 meet an edge of the clamp seat 311, the jaws 42, 43 are pushed toward each other and the clamping ends 421, 431 come to close with each other so as to retain a tool holder there between, as shown in FIG. 5.

The operation of the disclosed automatic tool-changing arm applied to an automatic tool changer of a machine tool will be described in detail. When the automatic tool changer is actuated to change tools for the machine tool, the automatic tool-changing arm arranged between the machine tool and a tool magazine firstly has its motor 212 driving dears in the gearbox 211 to rotate the trunk 31 so as to align the clamps at the two end of the trunk 31 with a tool presently assembled to a spindle of the machine tool and a tool at an outlet of the tool magazine, respectively. Then after the hydraulic cylinder 32 at the two ends of the trunk 31 operates the clamps 40 to grasp tool holders of said tools the hydraulic cylinder 13 on the immovable platform 10 is actuated so that the driving shaft end 132 thereof vertically pushes the movable platform 20 downward under the monitor of the sensors 251, 252. Therefore, the tool originally assembled to the spindle of the machine tool and the tool originally at the outlet of the tool magazine are drawn downward by the clamps 40 to descended positions. Afterward, the gearbox horizontally rotates the trunk 31 by a range of 180 degrees so as to positionally exchange the tool to be replaced and the tool to be assembled and align the tool to be assembled with the spindle of the machine tool and align the tool to be replaced with the tool magazine. At this time, the hydraulic cylinder 13 on the immovable platform 10 retracts its driving shaft 131 to drawn back the movable platform 20 to the immoveable platform 10. Thus, the tool to be replaced and the tool to be assembled are raised synchronously. So, after the tool to be assembled is assembled to the spindle and the tool to be replaced is positioned in the tool magazine, the tool change is accomplished.

By the aforementioned design, the disclosed automatic tool-changing arm is allowed to perform vertical movement and horizontal rotation precisely and stably. Besides, the two-jaw clamp of the disclosed automatic tool-changing arm is superior to the traditional hook-type clamp in reliability and applicability.

Although the particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. An automatic tool-changing arm of an automatic tool changer applicable to a machine tool, primarily comprising:
    an immovable platform;
    a movable platform located below the immovable platform;
    a platform driving device driving the movable platform to vertically move with respect to the immovable platform;
    a gear assembly settled on the moveable platform;
    an arm body fixedly attached to the movable platform and to be rotated relative to the movable platform about an axis by the gear assembly; and
    at least one rod fixedly attached to the movable platform and a corresponding through hole in the immovable platform arranged such that the at least one rod slides, during the vertical movement, in the corresponding through hole along an axis that is not coaxial with the axis of rotation of the arm body;
    wherein the arm body has two ends each equipped with a clamp driving device and a power clamp driven by the clamp driving device.

2. The automatic tool-changing arm of claim 1, wherein the platform driving device and the clamp driving devices are hydraulic cylinders.

3. The automatic tool-changing arm of claim 1, wherein each of the clamps comprises a leading block, a first jaw and a second jaw, the first jaw and the second jaw being connected with the leading block to form the clamp, which clamp is driven by the respective clamp driving device to open or close.

4. The automatic tool-changing arm of claim 1, wherein the through hole matches the at least one rod so that the at least one rod and the through hole permit the movable platform to move stably with respect to the immovable platform.

5. The automatic tool-changing arm of claim 1, further comprising a sensing device for sensing movements of the movable platform with respect to the immovable platform.

* * * * *